(12) United States Patent
Huang et al.

(10) Patent No.: US 12,282,632 B2
(45) Date of Patent: Apr. 22, 2025

(54) INFRARED TOUCH SCREEN FOR REDUCING TOUCH HEIGHT OF TOUCH PANEL

(71) Applicant: SHENZHEN TIMELINK TECHNOLOGY CO., LTD., Shenzhen (CN)

(72) Inventors: Kaixiang Huang, Shenzhen (CN); Huaqin Deng, Shenzhen (CN); Jian Lv, Shenzhen (CN)

(73) Assignee: SHENZHEN TIMELINK TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/584,285

(22) Filed: Feb. 22, 2024

(65) Prior Publication Data
US 2024/0310960 A1    Sep. 19, 2024

(30) Foreign Application Priority Data
Mar. 16, 2023  (CN) .......................... 202320644789.9

(51) Int. Cl.
*G06F 3/042* (2006.01)
(52) U.S. Cl.
CPC .. *G06F 3/0421* (2013.01); *G06F 2203/04109* (2013.01)

(58) Field of Classification Search
CPC ..................... G06F 3/0421; G06F 2203/04109
See application file for complete search history.

(56) References Cited

U.S. PATENT DOCUMENTS

| 2004/0212603 | A1* | 10/2004 | Cok ...................... G06F 3/0421 345/175 |
| 2006/0188196 | A1* | 8/2006 | Charters .............. G02B 6/1221 385/32 |
| 2019/0004668 | A1* | 1/2019 | Jeong ..................... G01J 1/0204 |
| 2022/0035481 | A1* | 2/2022 | Bergström ............ G06F 3/0428 |
| 2022/0221955 | A1* | 7/2022 | Bergström et al. .......................... G06F 3/04182 |

* cited by examiner

*Primary Examiner* — Sanghyuk Park
(74) *Attorney, Agent, or Firm* — Westbridge IP LLC (57) ABSTRACT

An infrared touch screen includes: a touch panel, a profile frame, an infrared module and a filter strip. The profile frame surrounds an edge of the touch panel, the profile frame is provided with a cavity having an opening; the infrared module is provided in the cavity and located below the touch panel; and the filter strip is provided at the opening. The filter strip is provided with at least two reflective arc surfaces, an infrared light is emitted by the infrared module and is emitted from the opening through a total reflection of the reflective arc surface.

9 Claims, 6 Drawing Sheets

INFRARED TOUCH SCREEN FOR REDUCING TOUCH HEIGHT OF TOUCH PANEL

CROSS-REFERENCE TO RELATED APPLICATIONS

The present application claims priority to Chinese Patent Application No. 202320644789.9, filed on Mar. 16, 2023, the entire contents of which are incorporated herein by reference.

TECHNICAL FIELD

The present application relates to the technical field of infrared touch screens, and in particular to an infrared touch screen.

BACKGROUND

The infrared touch screen in the related art generally consists of an infrared lamp tube array installed on a printed circuit board around the touch panel touch detection area. The infrared lamp tube array includes an infrared emission lamp tube and/or an infrared receiving lamp tube, and the infrared receiving lamp tube can receive the infrared light emitted by the corresponding infrared emission lamp tube. When there is a touch objective in the touch detection area, the light between the infrared emission lamp tube or the infrared receiving lamp tube is blocked by the touch objective, and the infrared receiving lamp tube cannot receive the infrared light emitted by the infrared emission lamp tube. The positional information of the touch objective can be determined according to the positional information of the infrared receiving lamp tube which cannot receive the infrared light.

Figure 1:
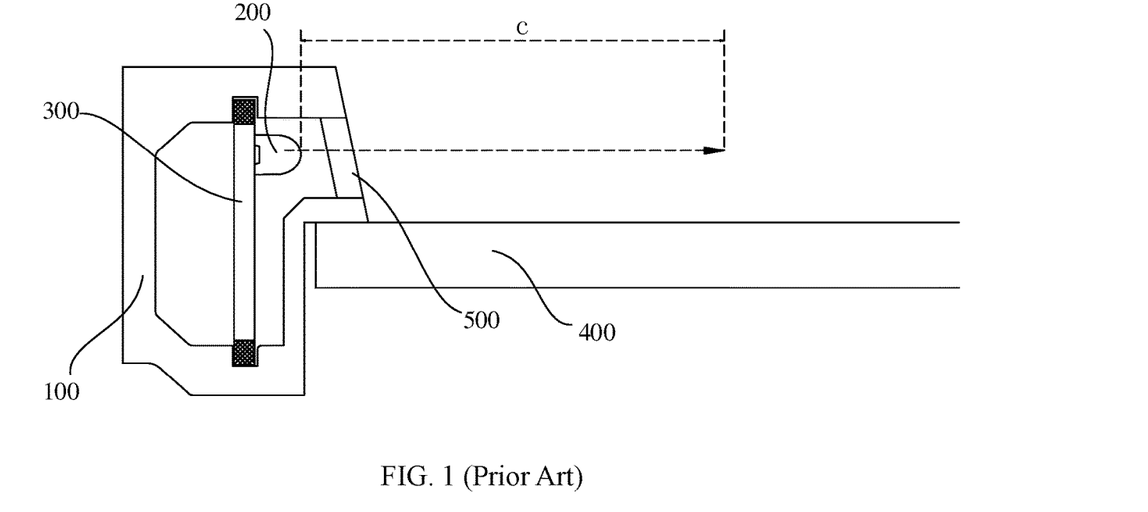
FIG. 1 is a schematic structural view of a traditional infrared touch screen.

As shown in FIG. 1, the infrared touch screen in the related art places the infrared lamp tube on the edge of the touch panel. The conventional assembly method is to install and fix the infrared lamp tube in the chamber of the profile frame. The circuit board is perpendicular to the touch panel. The infrared lamp tube on the circuit board is located diagonally above the edge of the touch panel. The infrared light directly passes through the filter strip to form the touch detection area on the touch panel. This conventional assembly method results in a large profile frame size, a high touch height, and a poor edge touch effect.

SUMMARY

The main purpose of the present application is to provide an infrared touch screen, aiming to solve the problems of the large size, the high touch height, and the poor edge touch effect of the infrared touch screen profile frame.

In order to achieve the above purpose, the infrared touch screen provided by the present application includes: a touch panel, a profile frame, an infrared module and a filter strip.

The profile frame surrounds an edge of the touch panel, the profile frame is provided with a cavity having an opening; the infrared module is provided in the cavity and located below the touch panel; the filter strip is provided at the opening; the filter strip is provided with at least two reflective arc surfaces, an infrared light is emitted by the infrared module and is emitted from the opening through a total reflection of the reflective arc surface.

In an embodiment, the profile frame includes an upper edge of the frame, a left edge of the frame, a lower edge of the frame, a right edge of the frame, a middle edge of the frame and a frame ridge; a lower end of the upper edge of the frame is connected to an upper end of the left edge of the frame, a lower end of the left edge of the frame is connected to a left end of the lower edge of the frame, a right end of the lower edge of the frame is connected to a lower end of the right edge of the frame, an upper end of the right edge of the frame is connected to a right end of the middle edge of the frame, and a left end of the middle edge of the frame is connected to a lower end of the frame ridge; the upper edge of the frame, the left edge of the frame, the lower edge of the frame, the right edge of the frame, the middle edge of the frame, and the frame ridge are enclosed to form the cavity, and the opening is formed between the upper edge of the frame and the frame ridge; and the touch panel is abutted against an upper surface of the middle edge of the frame, a side surface of the frame ridge, and a bottom surface of the filter strip.

In an embodiment, the infrared module includes a circuit board and an infrared lamp tube provided on the circuit board, and the circuit board is parallel to the touch panel.

In an embodiment, the left edge of the frame is provided with a first groove, the right edge of the frame is provided with a second groove, and both sides of the circuit board are respectively snapped into the first groove and the second groove.

In an embodiment, the frame ridge is provided with a concave buckle, the filter strip is provided with a convex buckle matched with the concave buckle, and the convex buckle is buckled into the concave buckle to fix the filter strip at the opening.

In an embodiment, a limiting block is protrudingly provided at a right end of the upper edge of the frame, and the limiting block is abutted against an upper end of the filter strip to limit the filter strip at the opening.

In an embodiment, at least two reflective arc surfaces include a first reflective arc surface and a second reflective arc surface opposite to the first reflective arc surface, a first gap is formed between the first reflective arc surface and the upper edge of the frame, and a second gap is formed between the second reflective arc surface and the frame ridge.

In an embodiment, a thickness of the filter strip is $\alpha$, an arc radius of the first reflective arc surface and the second reflective arc surface is $\beta$, and $\beta$ is not greater than $2\alpha$.

In an embodiment, the filter strip is provided with a light-in surface and a light-out surface, the infrared light enters through the light-in surface and is emitted from the light-out surface through a total reflection of the first reflective arc surface and the second reflective arc surface; and the light-in surface is perpendicular to the light-out surface, and the light-out surface is perpendicular to the touch panel.

In an embodiment, a refractive index of the filter strip is greater than 1.414.

In the technical solution of the present application, the infrared touch screen includes a touch panel, a profile frame, an infrared module and a filter strip. The profile frame surrounds the edge of the touch panel, and the profile frame is provided with a cavity having an opening. The infrared module is provided in the cavity and below the touch panel, the filter strip is arranged at the opening, and the filter strip is provided with at least two reflective arc surfaces. The infrared light is emitted by the infrared module, and is emitted from the opening through the total reflection of the reflective arc surface. In this way, by placing the infrared module below the touch panel, the infrared light is emitted from the opening through the total reflection of the reflective arc surface, which not only reduces the width of the profile frame by replacing the superimposed width of the traditional infrared lamp tube and the circuit board in the left and right direction with the thickness of the filter strip, but also reduces the thickness of the profile frame in the up and down direction by replacing the method that the infrared lamp tube is located diagonally above the touch panel with the width of the filter strip, reduces the overall touch frame size, and improves the overall visual effect. Since the thickness of the arc-shaped filter strip replaces the traditional infrared module in which the infrared lamp tube is located diagonally above the touch panel, the distance between the infrared light and the touch panel is smaller. The infrared light is closer to the touch panel, which reduces the touch height of the touch panel and prevents the signal transmission of the infrared being blocked when the touch objective used by the user is far away from the touch panel. At the same time, due to the total reflection of the light in the arc-shaped filter strip, the path of the light is changed, and the touch area near the edge of the infrared lamp tube in the infrared module is reduced, thus the edge touch effect of the profile frame is improved.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that all directional indications (such as up, down, left, right, front, back, etc.) in the embodiments of the present application are only used to explain the relative positional relationship, the movement situation, etc. among various assemblies under a certain posture as shown in the drawings. If the specific posture changes, the directional indication also changes accordingly.

In addition, if there are descriptions related to "first", "second", etc. in the embodiments of the present application, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. Besides, the meaning of "and/or" appearing in the application includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

The infrared touch screen in the related art generally consists of an infrared lamp tube array installed on a printed circuit board around the touch panel touch detection area. The infrared lamp tube array includes an infrared emission lamp tube and/or an infrared receiving lamp tube, and the infrared receiving lamp tube can receive the infrared light emitted by the corresponding infrared emission lamp tube. When there is a touch objective in the touch detection area, the light between the infrared emission lamp tube or the infrared receiving lamp tube is blocked by the touch objective, and the infrared receiving lamp tube cannot receive the infrared light emitted by the infrared emission lamp tube. The positional information of the touch objective can be determined according to the positional information of the infrared receiving lamp tube which cannot receive the infrared light.

As shown in FIG. 1, in the infrared touch screen in the related art, the infrared lamp tube is placed on the edge of the touch panel. The conventional assembly method is to install and fix the infrared lamp tube in the chamber of the profile frame. The circuit board is perpendicular to the touch panel. The infrared lamp tube on the circuit board is located above the edge of the touch panel. The infrared light directly passes through the filter strip to form the touch detection area on the touch panel. This conventional assembly method results in a large profile frame size, a high touch height, and a poor edge touch effect.

Please refer to FIG. 2 to FIG. 6, the present application provides an infrared touch screen.

Figure 2:
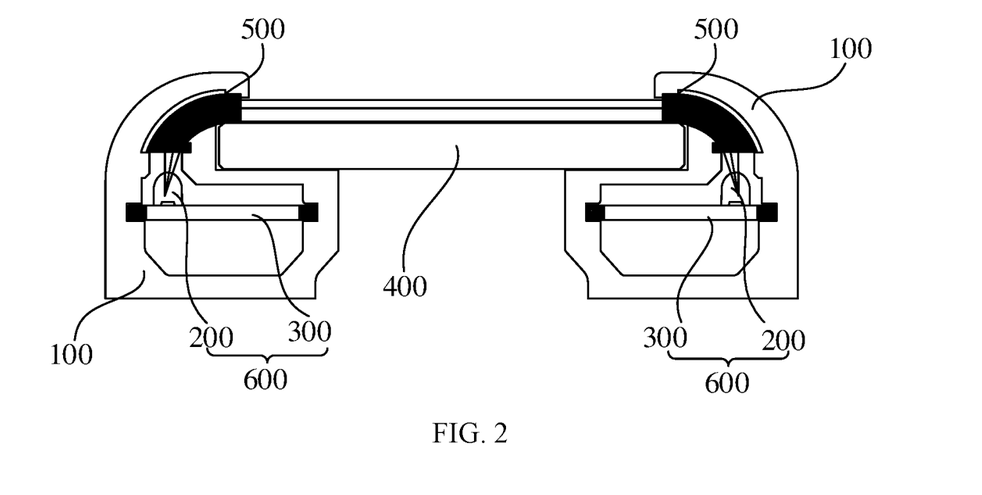
FIG. 2 is a schematic structural view of an infrared touch screen according to an embodiment of the present application.
Figure 3:
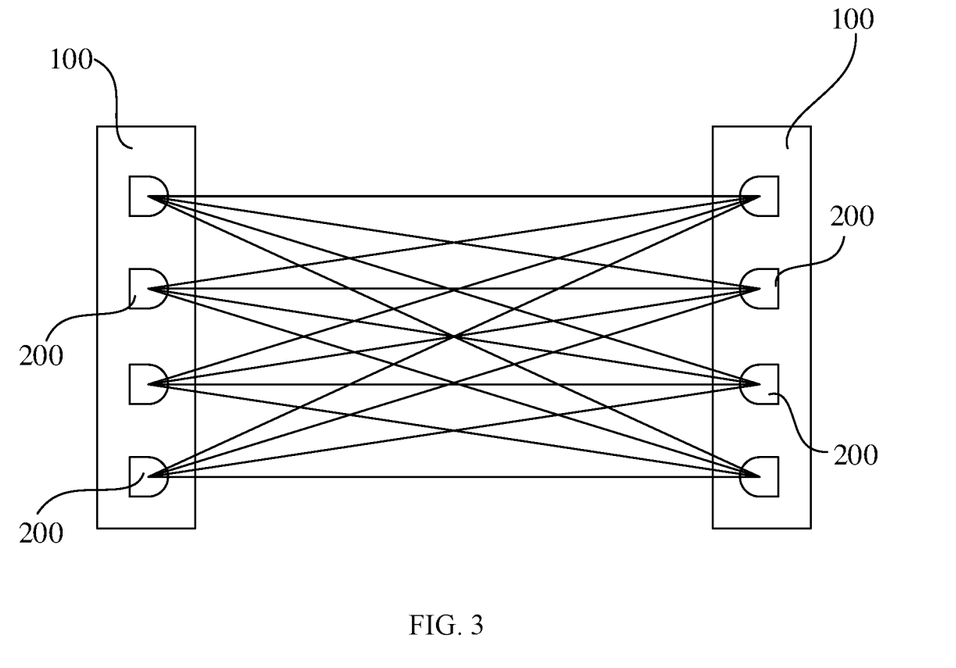
FIG. 3 is a schematic structural view of a correlation radiation of an infrared lamp tube in the infrared touch screen according to an embodiment of the present application.

The infrared touch screen includes a touch panel 400, a profile frame 100, an infrared module 600 and a filter strip 500. The profile frame 100 surrounds an edge of the touch panel 400, and the profile frame 100 is provided with a cavity 630 having an opening. The infrared module 600 is provided in the cavity 630 and is below the touch panel 400. The filter strip 500 is provided at the opening, the filter strip 500 is provided with at least two reflective arc surfaces. The infrared light is emitted by the infrared module 600, and is emitted from the opening through a total reflection of the reflective arc surface.

Specifically, the infrared module 600 includes a circuit board 300 and an infrared lamp tube provided on the circuit board 300. The infrared lamp tube can be an infrared emission lamp tube or an infrared receiving lamp tube. The light emitted by the infrared lamp tube in the infrared module 600 passes through the filter strip 500, and the total reflection occurs on the reflective arc surface inside the filter strip 500. After the reflection, the light is parallel to the touch panel 400 and is received by the infrared lamp tube on the opposite side, thus the infrared signal are transmitted to form the touch detection area on the touch panel 400. Since the infrared light is totally reflected by the reflective arc surface of the filter strip 500, the infrared touch screen of the present application has less light loss, which can enhance a touch accuracy of the infrared touch screen. At the same time, by placing the infrared module below the touch panel 400, the infrared light is emitted from the opening through the total reflection of the reflective arc surface, which not only reduces the width of the profile frame 100 by replacing the superimposed width of the traditional infrared lamp tube and the circuit board 300 in the left and right direction with the thickness of the filter strip 500, but also reduces the thickness of the profile frame 100 in the up and down direction by replacing the method that the infrared lamp tube is located diagonally above the touch panel 400 with the width of the filter strip 500, which reduces the overall size of the touch frame, and improves the overall visual effect. Since the thickness of the arc-shaped filter strip 500 replaces the traditional infrared module 600 in which the infrared lamp tube is located diagonally above the touch panel 400, the distance between the infrared light and the touch panel 400 is smaller. The infrared light is closer to the touch panel 400, which reduces the touch height of the touch panel 400 and prevents the signal transmission of the infrared being blocked when the touch objective used by the user is far away from the touch panel 400.

Figure 5:
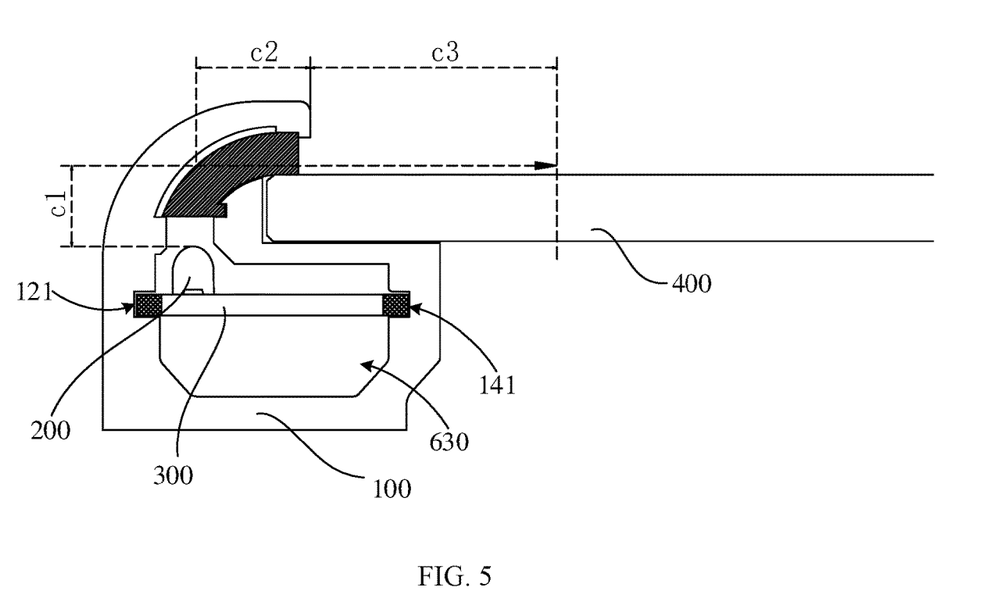
FIG. 5 is a labeled view of a light path of the infrared lamp tube in the infrared touch screen according to an embodiment of the present application.

Comparing FIG. 1 and FIG. 5, due to the total reflection of the light on the reflective arc surface in the filter strip 500, the path of the light is changed, the touch area close to the edge of the infrared lamp tube is reduced, so that the edge touch effect of the profile frame 100 is improved. It can be understood that the infrared emitted by the infrared lamp tube has a poor touch control effect during a length C, and is generally configured as a touch blind area. As shown in FIG. 5, c1+c2+c3=C in the infrared touch screen of the present application, the light direction is changed by the total reflection of the arc surface of the infrared light in the filter strip 500, and part of the infrared light path is in the filter strip 500, a size of c3 is reduced, so that the touch blind area is reduced, which can enhance the edge touch effect.

Figure 4:
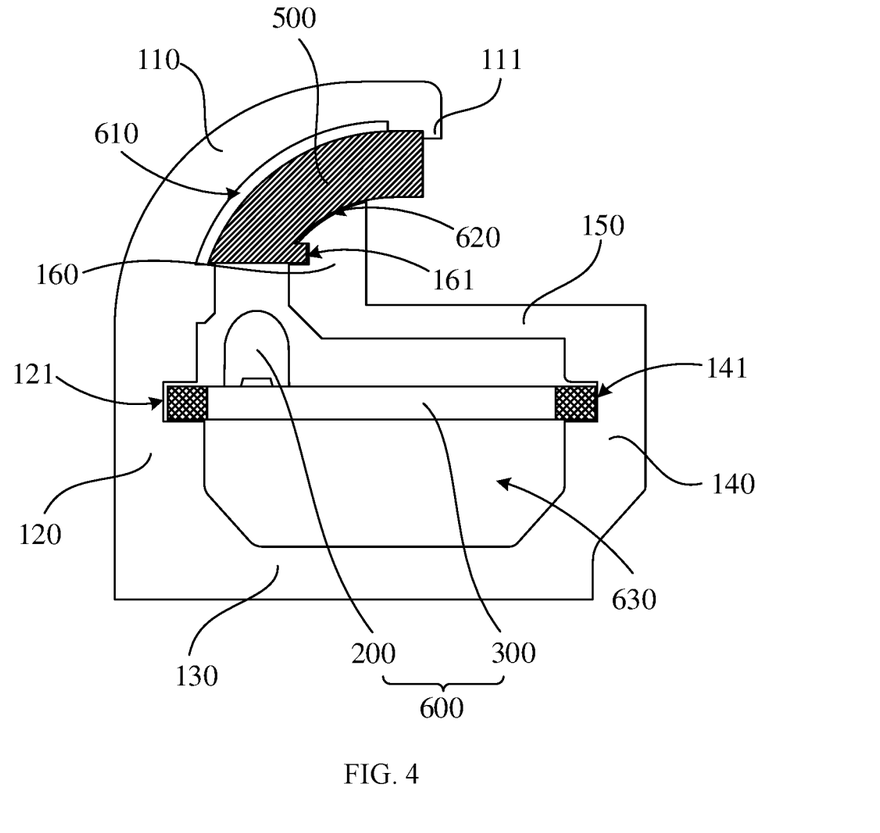
FIG. 4 is a schematic structural view of a profile frame at one side of the infrared touch screen according to an embodiment of the present application.

Please refer to FIG. 4, in an embodiment, the profile frame 100 includes an upper edge of the frame 110, a left edge of the frame 120, a lower edge of the frame 130, a right edge of the frame 140, a middle edge of the frame 150 and a frame ridge 160. A lower end of the upper edge of the frame 110 is connected to an upper end of the left edge of the frame 120, and a lower end of the left edge of the frame 120 is connected to a left end of the lower edge of the frame 130, a right end of the lower edge of the frame 130 is connected to a lower end of the right edge of the frame 140, an upper end of the right edge of the frame 140 is connected to a right end of the middle edge of the frame 150, and a left end of the middle edge of the frame 150 is connected to a lower end of the frame ridge 160. The upper edge of the frame 110, the left edge of the frame 120, the lower edge of the frame 130, the right edge of the frame 140, the middle edge of the frame 150, and the frame ridge 160 are enclosed to form a cavity 630. The opening is formed between the upper edge of the frame 110 and the frame ridge 160. The touch panel 400 is abutted against an upper surface of the middle edge of the frame 150, a side surface of the frame ridge 160, and a bottom surface of the filter strip 500. In this way, the infrared module 600 is below the touch panel 400, and part of section of the profile frame 100 is also below the touch panel 400. The structural space of the profile frame 100 is rationally utilized to reduce the thickness of the touch frame and improve the overall visual effect. In an embodiment, the frame ridge 160 is perpendicular to the middle edge of the frame 150, the middle edge of the frame 150 is perpendicular to the right edge of the frame 140, the right edge of the frame 140 is perpendicular to the lower edge of the frame 130, and the lower edge of the frame 130 is perpendicular to the left edge of the frame 120.

Please refer to FIG. 2, in an embodiment, the infrared module 600 includes the circuit board 300 and the infrared lamp tube provided on the circuit board 300. The circuit board 300 is parallel to the touch panel 400. In other embodiments, the circuit board 300 and the touch panel 400 may be arranged at an included angle, and the included angle therebetween may be 0 to 10 degrees.

Referring to FIG. 4, in an embodiment, the left edge of the frame 120 is provided with a first groove 121, the right edge of the frame 140 is provided with a second groove 141, and both sides of the circuit board 300 are respectively snapped into the first groove 121 and the second groove 141. In this way, the first groove 121 and the second groove 141 can limit the circuit board 300, which has a simple structure and is easy to implement.

Please refer to FIG. 4, in order to facilitate the installation of the filter strip 500, in an embodiment, a concave buckle 161 is provided on the frame ridge 160, and a convex buckle 550 matched with the concave buckle 161 is provided on the filter strip 500, so that the convex buckle 550 is buckled into the concave buckle 161 to fix the filter strip 500 at the opening. In this way, the buckle form is convenient for installation, and the cooperation of the convex buckle 550 and the concave buckle 161 can limit the filter strip 500 in the up, down, left and right directions.

Please refer to FIG. 4, in an embodiment, the right end of the upper edge of the frame 110 is protrudingly provided with a limiting block 111, and the limiting block 111 is abutted against the upper end of the filter strip 500 to limit the filter strip 500 at the opening. It can be understood that the limiting block 111 can prevent the filter strip 500 from moving toward the outlet of the profile frame 100 and limit the filter strip 50 at the opening to ensure the installation stability of the filter strip 500.

Please refer to FIG. 4, it can be understood that in order to meet the total reflection condition, a certain gap needs to be reserved from the arc surface of filter strip 500 to the profile frame 100. In an embodiment, at least two reflective arc surfaces include a first reflective arc surface 510 and a second reflective arc surface 520 opposite to the first reflective arc surface 510. A first gap 610 is formed between the first reflective arc surface 510 and the upper edge of the frame 110, and a second gap 620 is formed between the second reflective arc surface 520 and the frame ridge 160.

Figure 6:
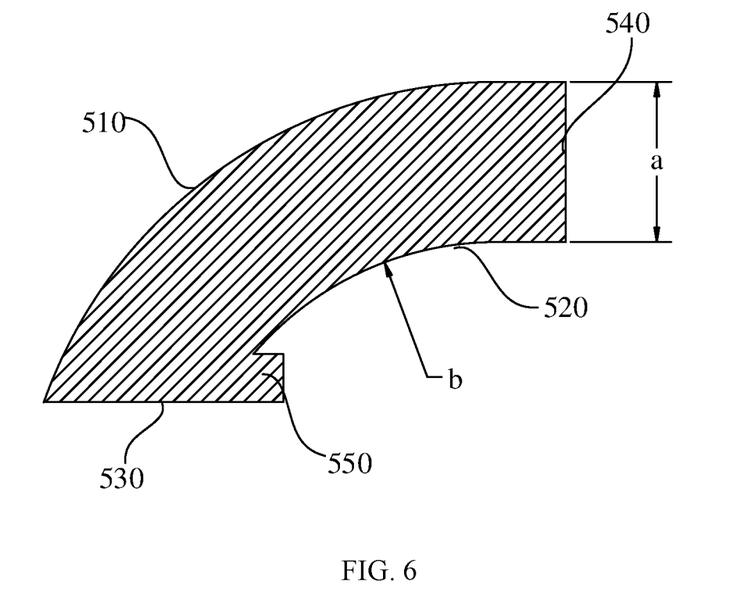
FIG. 6 is a schematic structural view of a filter strip of the infrared touch screen according to an embodiment of the present application.

Please refer to FIG. 6, in order to ensure that the infrared light is totally reflected on the arc surface of the filter strip 500, in an embodiment, the thickness of the filter strip 500 is $\alpha$, the arc radius of the first reflective arc surface 510 and the second reflective arc surface 520 is $\beta$, and $\beta$ is not greater than $2\alpha$.

Referring to FIG. 6, in an embodiment, the filter strip 500 is also provided with a light-in surface 530 and a light-out surface 540. The infrared light enters through the light-in surface 530 and is emitted from the light-out surface 540 through the total reflection of the first reflective arc surface 510 and the second reflective arc surface 520. The light-in surface 530 is perpendicular to the light-out surface 540, and the light-out surface 540 is perpendicular to the touch panel 400. It can be understood that the light-in surface 530 and the light-out surface 540 of the filter strip 500 are perpendicular to the light path. After the infrared light passes through the filter strip 500 and is totally reflected inside the arc-shaped filter strip 500, the reflected infrared light is parallel to the touch panel 400 and is received by the infrared lamp tube on the opposite side, thus forming an effective infrared signal transmission.

In an embodiment, the filter strip 500 has a refractive index greater than 1.414, and the larger the refractive index, the better the total reflection effect is, which ensures the touch effect.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. An infrared touch screen, comprising:
a touch panel;
a profile frame surrounding an edge of the touch panel, wherein the profile frame is provided with a cavity having an opening;
an infrared module provided in the cavity and located below the touch panel; and
a filter strip provided at the opening;
wherein the filter strip is provided with at least two reflective arc surfaces, an infrared light is emitted by the infrared module and is emitted from the opening through a total reflection of the reflective arc surface;
the at least two reflective arc surfaces comprise a first reflective arc surface and a second reflective arc surface opposite to the first reflective arc surface, the first reflective arc surface fits closely with the shape of the profile frame and a first gap is formed between the first reflective arc surface and the profile frame, and the second reflective arc surface fits closely with the shape of the profile frame and a second gap is formed between the second reflective arc surface and the profile frame.

2. The infrared touch screen of claim 1, wherein the profile frame comprises an upper edge of the frame, a left edge of the frame, a lower edge of the frame, a right edge of the frame, a middle edge of the frame and a frame ridge;
a lower end of the upper edge of the frame is connected to an upper end of the left edge of the frame, a lower end of the left edge of the frame is connected to a left end of the lower edge of the frame, a right end of the lower edge of the frame is connected to a lower end of the right edge of the frame, an upper end of the right edge of the frame is connected to a right end of the middle edge of the frame, and a left end of the middle edge of the frame is connected to a lower end of the frame ridge;
the upper edge of the frame, the left edge of the frame, the lower edge of the frame, the right edge of the frame, the middle edge of the frame, and the frame ridge are enclosed to form the cavity, and the opening is formed between the upper edge of the frame and the frame ridge; and
the touch panel is abutted against an upper surface of the middle edge of the frame, a side surface of the frame ridge, and a bottom surface of the filter strip.

3. The infrared touch screen of claim 2, wherein the infrared module comprises a circuit board and an infrared lamp tube provided on the circuit board, and the circuit board is parallel to the touch panel.

4. The infrared touch screen of claim 3, wherein the left edge of the frame is provided with a first groove, the right edge of the frame is provided with a second groove, and both sides of the circuit board are respectively snapped into the first groove and the second groove.

5. The infrared touch screen of claim 2, wherein the frame ridge is provided with a concave buckle, the filter strip is provided with a convex buckle matched with the concave buckle, and the convex buckle is buckled into the concave buckle to fix the filter strip at the opening.

6. The infrared touch screen of claim 5, wherein a limiting block is protrudingly provided at a right end of the upper edge of the frame, and the limiting block is abutted against an upper end of the filter strip to limit the filter strip at the opening.

7. The infrared touch screen of claim 1, wherein a thickness of the filter strip is a, an arc radius of the first reflective arc surface and the second reflective arc surface is β, and β is not greater than 2α.

8. The infrared touch screen of claim 1, wherein the filter strip is provided with a light-in surface and a light-out surface, the infrared light enters through the light-in surface and is emitted from the light-out surface through a total reflection of the first reflective arc surface and the second reflective arc surface; and
the light-in surface is perpendicular to the light-out surface, and the light-out surface is perpendicular to the touch panel.

9. The infrared touch screen of claim 1, wherein a refractive index of the filter strip is greater than 1.414.

* * * * *